United States Patent
Norris et al.

(10) Patent No.: US 9,550,249 B2
(45) Date of Patent: Jan. 24, 2017

(54) HIGH POWER FACTOR RECTIFIER/FILTER FOR THREE PHASE INPUT WELDER OR PLASMA CUTTER

(71) Applicant: Thermal Dynamics Corporation, West Lebanon, NH (US)

(72) Inventors: Stephen W. Norris, New London, NH (US); Roger M. Chamberlin, Grantham, NH (US)

(73) Assignee: Victory Equipment Company, Denton, TX (US)

( * ) Notice: Subject to any disclaimer, the term of this patent is extended or adjusted under 35 U.S.C. 154(b) by 325 days.

(21) Appl. No.: 14/167,484

(22) Filed: Jan. 29, 2014

(65) Prior Publication Data
US 2014/0209588 A1    Jul. 31, 2014

Related U.S. Application Data

(60) Provisional application No. 61/759,070, filed on Jan. 31, 2013.

(51) Int. Cl.
*B23K 9/10* (2006.01)
*H02M 1/42* (2007.01)
*H02M 7/06* (2006.01)

(52) U.S. Cl.
CPC ........... *B23K 9/1043* (2013.01); *B23K 9/1056* (2013.01); *H02M 1/4216* (2013.01); *H02M 1/4266* (2013.01); *H02M 7/06* (2013.01); *Y02P 70/181* (2015.11)

(58) Field of Classification Search
CPC ........... B23K 9/09; B23K 9/10; B23K 9/1006; B23K 9/1012; B23K 9/1043; B23K 9/1062; B23K 9/091
See application file for complete search history.

(56) References Cited

U.S. PATENT DOCUMENTS

| | | | |
|---|---|---|---|
| 4,048,468 A | 9/1977 | Maule | |
| 5,710,696 A * | 1/1998 | Reynolds | B23K 9/1043 363/132 |
| 2003/0201262 A1* | 10/2003 | Katooka | B23K 9/1062 219/130.51 |
| 2010/0045247 A1* | 2/2010 | Blanken | H03F 3/211 323/273 |

OTHER PUBLICATIONS

International Search Report and Written Opinion for PCT/US2014/013594 dated Jul. 24, 2014.

* cited by examiner

*Primary Examiner* — Brian Jennison

(57) ABSTRACT

A power supply is provided. The power supply in one form includes a rectifier circuit, a capacitor and an RC circuit. The rectifier circuit is configured to receive a three phase AC signal. The rectifier circuit has a positive output connected to a positive node and a negative output connected to a negative node. The capacitor is connected in parallel with the rectifier circuit between the positive node and the negative node. The RC circuit includes a resistor and capacitor connected in electrical series connection where the resistor and capacitor are connected between the positive node and the negative node in parallel with the first capacitor and the rectifier circuit.

18 Claims, 7 Drawing Sheets

HIGH POWER FACTOR RECTIFIER/FILTER FOR THREE PHASE INPUT WELDER OR PLASMA CUTTER

CROSS-REFERENCE TO RELATED APPLICATIONS

This application claims the benefit of provisional application No. 61/759,070, filed on Jan. 31, 2013. The disclosure of the above application is incorporated herein by reference.

FIELD

The present disclosure generally relates to high power factor in power supplies for welding or cutting equipment.

BACKGROUND

Known power supplies for welding or cutting typically use a large capacitance across a rectified line voltage to store energy for converter filtering and holdup requirements. In order to realize a high power factor, some impedance must be inserted in series with the large capacitance to limit and/or shape the current, if a high power factor is desired. This might be a large line frequency inductance, or a switching power factor corrector. The first is very large and can be expensive, and the second is expensive and dissipates a significant amount of power.

SUMMARY

The power supply of present application provides one implementation of a high power factor circuit. The power supply includes a rectifier circuit, a capacitor and an RC circuit. The rectifier circuit is configured to receive a three phase AC signal. The rectification circuit has a positive output connected to a positive node and a negative output connected to a negative node. The capacitor is connected in parallel with the rectifier circuit between the positive node and the negative node. The RC circuit includes a resistor and capacitor connected in electrical series connection where the resistor and capacitor are connected between the positive node and the negative node in parallel with the first capacitor and the rectifier circuit.

In one form, a power supply for a welder or cutter is provided that comprises a rectifier circuit configured to receive a three phase AC signal, a rectification circuit having a positive output connected to a positive node and the rectifier circuit having a negative output connected to a negative node, a first capacitor connected in parallel with the rectifier circuit between the positive node and the negative node, and a first RC circuit including a first resistor and second capacitor connected in electrical series connection where the first resistor and second capacitor are connected between the positive node and the negative node in parallel with the first capacitor and the rectifier circuit.

In another form, a power supply is provided that comprises a rectifier circuit configured to receive a three phase AC signal, a rectification circuit having a positive output connected to a positive node and the rectifier circuit having a negative output connected to a negative node, a first capacitor connected in parallel with the rectifier circuit between the positive node and the negative node, a first RC circuit including a first resistor and second capacitor connected in electrical series connection where the first resistor and second capacitor are connected between the positive node and the negative node in parallel with the first capacitor and the rectifier circuit, and a second RC circuit including a second resistor and third capacitor connected in electrical series connection where the second resistor and third capacitor are connected between the positive node and the negative node in parallel with the first capacitor and the rectifier circuit.

Further objects, features and advantages of this invention will become readily apparent to persons skilled in the art after a review of the following description, with reference to the drawings and claims that are appended to and form a part of this specification.

DETAILED DESCRIPTION

Figure 1:
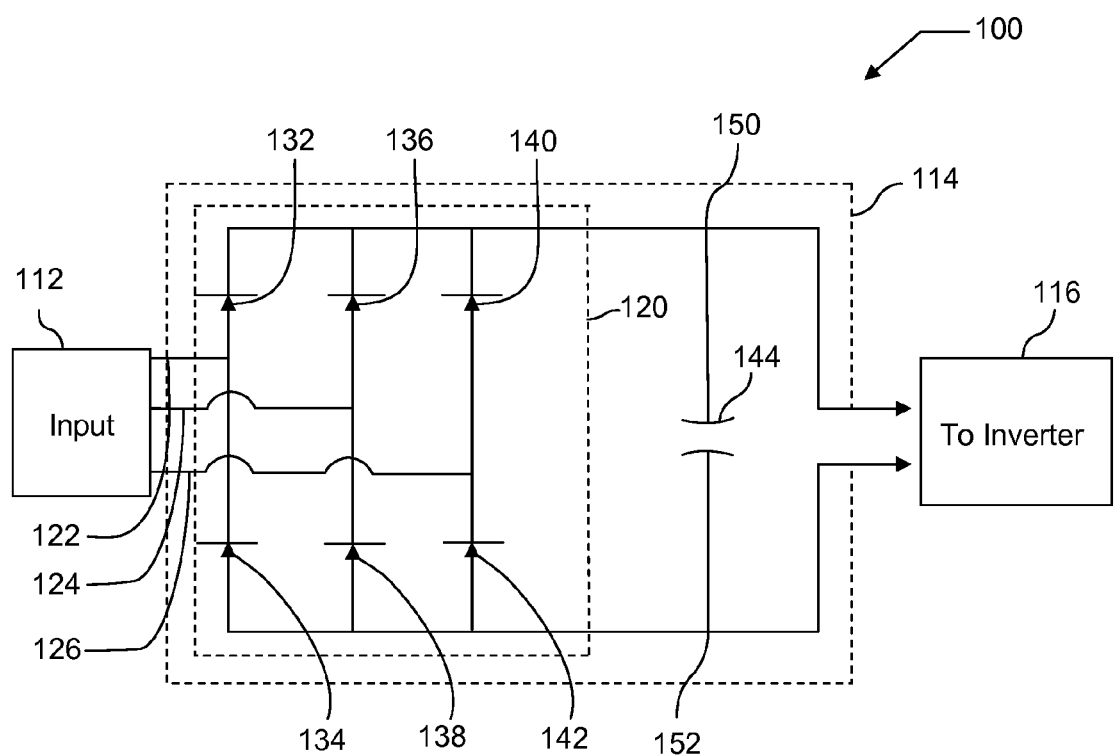
FIG. 1 is a high power factor circuit for three phase welder.

Referring to FIG. 1, a power supply system 100 is provided that may be used for a welder, plasma cutter, or other industrial device. The power supply system includes a power source 112, a high power factor circuit 114 and inverter 116. The power source 112 provides a three phase AC voltage as an input to the high power factor circuit 114. Each phase of the three phases is provided along a separate input 122, 124, and 126. The high power factor circuit 114 includes a rectifier circuit 120 such as a three phase bridge configured to receive each input from the three phase power source 112. In one example, the first input 122 is provided to a first parallel branch of the rectifier circuit 120.

The first parallel branch of the rectifier circuit 120 includes a first diode 132 and a second diode 134 provided in an electrical series arrangement. The first diode 132 has a cathode connected to a positive node 150 of the circuit and an anode connected to the cathode of the second diode 134. The second diode 134 includes an anode connected to a second negative node 152 of the circuit. As such, the first input 122 is connected between the anode of the first diode 132 and the cathode of the second diode 134 such that the signal across the first positive node 150 and the second negative node 152 is rectified.

Similarly, a second input 124 is connected to a second parallel bridge of the rectifier circuit 120. The second bridge includes a first diode 136 and a second diode 138. The first diode 136 has a cathode connected to the first positive node 150 and an anode connected to the cathode of the second diode 138. The second diode 138 also includes an anode connected to the negative node 152. As such, the second input 124 is connected between the anode of the first diode 136 and the cathode of the second diode 138 such that the voltage provided from the second input 124 is rectified across the first positive node 150 and the second negative node 152.

Additionally, the third parallel bridge includes a first diode 140 and a second diode 142. The first diode 140 includes a cathode connected to the first positive node 150 and an anode connected to the cathode of the second diode 142. The second diode 142 includes an anode connected to the second negative node 152. Accordingly, the third input 126 is connected to the anode of the first diode 140 and the cathode of the second diode 142 such that the third parallel bridge rectifies the voltage provided for the first input 126 across the first positive node 150 and the negative second node 152. In addition, a capacitor 144 is provided across the first positive node 150 and the second negative node 152. The capacitor 144 may be about 30 microfarads and may provide stability to the rectified voltage. A position terminal of the inverter 116 is connected to the first positive node 150 and the negative terminal of the inventor 116 is connected to the second negative node 152 of the high power factor circuit 114. The capacitor 144 also localizes the current drawn by the fast switching inverter 116. Since the capacitor 144 is so small, the in rush current is also small, thereby eliminating the need for an in-rush limiting circuit. Further, since the current from the diode bridge to the capacitor 144 looks like a DC signal with a small amount of ripple, each input line current looks quite uniform as illustrated in FIG. 4.

Figure 2:
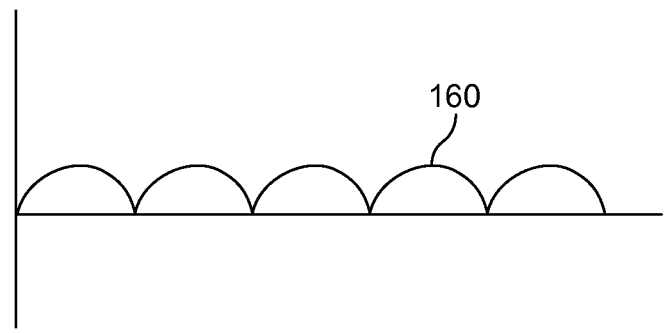
FIG. 2 is a graph of a single phase rectified voltage.
Figure 3:
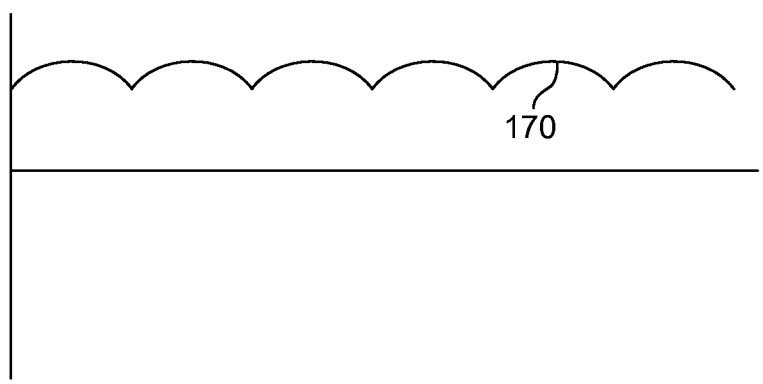
FIG. 3 is a graph of a three phase rectified voltage.

FIG. 2 is an illustration of a single phase rectified voltage. Line 160 represents the rectified single phase AC voltage without any capacitor storage applied. It is noted that line 160 goes to zero twice per cycle. However, as shown in FIG. 3, a rectified three phase AC voltage 120 never reaches zero. Therefore, the capacitor 144 does not require a large capacitance to stabilize the voltage across the first positive node 150 and the second negative node 152. This is because the rectified voltage is already never lower than about 85% of the peak voltage.

Figure 4:
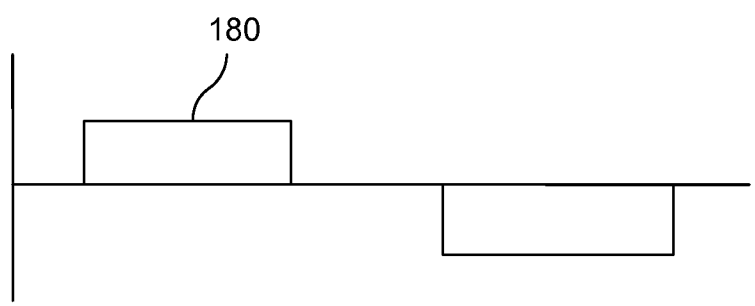
FIG. 4 is a graph of the line input current for the three phase inputs in FIG. 1.

Accordingly, the input line current for power source inputs 122, 124, and 126, look like line 180 provided in FIG. 4. As such, a maximum power factor of 0.955 or approximately 95.5% is provided. Although due to design and manufacturing constraints, the attained power factor may actually be closer to about 90-95%.

Figure 5:
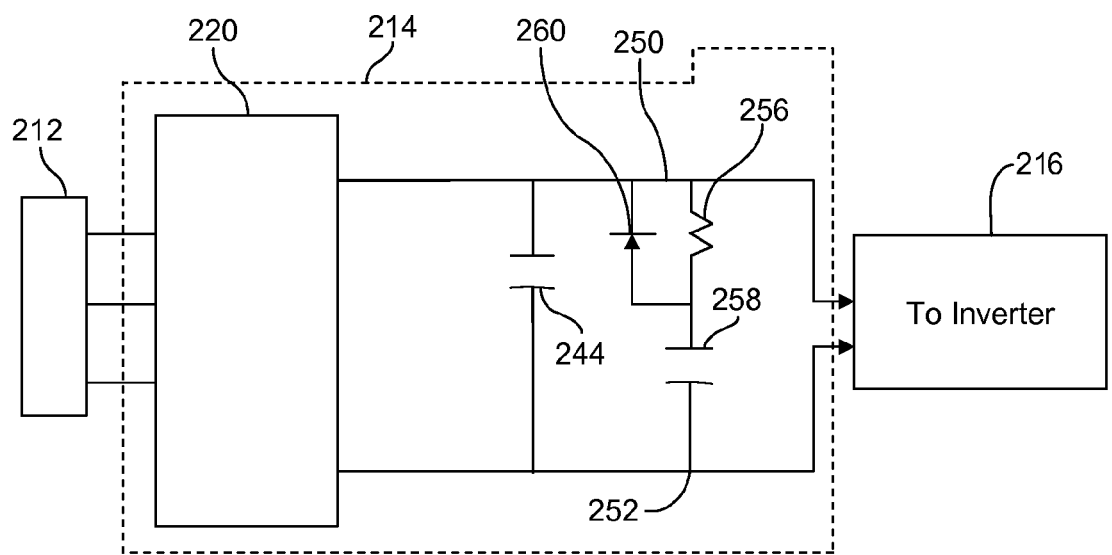
FIG. 5 is another implementation of a high power factor circuit for a welder.

Now referring to FIG. 5, the three phase power source 212 is connected to a rectification circuit 220, for example a three phase bridge. The three phase bridge may be of the same type shown in FIG. 1, although it is understood that various other rectification configurations may be used. The high power factor circuit 214 includes a rectification circuit 220 as well as other stabilization circuitry. The positive output of the rectification circuit 220 is provided to a first positive node 250 and the negative output of the rectification circuit 220 is provided to a negative node 252. A first capacitor 244 is connected in parallel to the rectification circuit 220 across the positive node 250 and the negative node 252. The first capacitor 244 may have a capacitance of about 30 microfarads.

In addition, an RC circuit may be connected and parallel with the first capacitor 244 and the rectification circuit 220, across the positive node 250 and the negative node 252. The RC circuit includes a first resistor 256 and a capacitor 258. The resistor 256 may be in electrical series connection with capacitor 258. In one implementation, the first side of the resistor 256 may be connected to the positive node 250 and the second side of the resistor 256 may be connected to a first side of the capacitor 258. The second side of the capacitor 258 may be connected to the negative node 252. Although it is understood in certain implementations, the resistor and capacitor could be switched. Further, it is also understood that the resistor and capacitor may include multiple resistive or capacitive components, respectively, and could be used to achieve similar effects.

In addition, a diode 260 may be connected between the second side of the resistor 256 and the first side of the capacitor 258. For example, the anode of the diode 260 may be connected between the second side of the resistor 256 and the second side of the capacitor 258 while the cathode of the diode 260 may be connected to positive node 250 of the high power factor circuit 214. In this manner, the diode 260 may be in electrical parallel connection with the resistor 256. As such, the positive node 250 may be connected to a positive terminal of the inverter 216 and the negative node 252 may be connected to a negative terminal of the inverter 216.

While the small capacitance of the capacitor 244 alone provides usable power factor, there is very little duration for the stabilization. If the supply line suddenly drops for one half of a cycle, it would be preferred for the power supply to continue providing power. Accordingly, a second capacitance from capacitor 258 may be added in such a way as to not affect the high power factor. Accordingly, the capacitor 258 may be thousands of microfarads. For example, capacitor 258 may be greater than 1000 µf and possibly between 1000-50,000 µf.

The capacitor 258 may be charged through resistor 256 which limits the charge current that keeps the power factor high. However, if the line and thus the voltage of capacitor 244 suddenly drops, energy flows through the diode 260 to stabilize the inverter voltage. In addition, since the inverter sometimes acts like a negative resistance load to the filter, another RC circuit may be added for dampening purposes as illustrated in FIG. 6.

Figure 6:
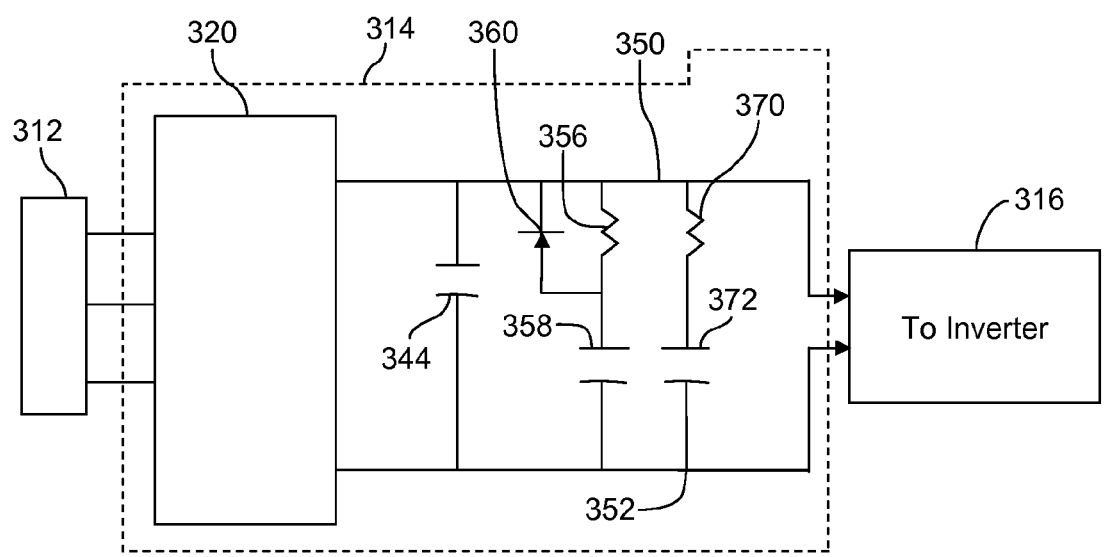
FIG. 6 is yet another implementation of a high power factor circuit for a welder.

FIG. 6 is a schematic of a system including a three phase AC power source 312, a high power factor circuit 314 and an inverter 316. The high power factor circuit 314 includes a rectification circuit 320 as well as other stabilization circuitry. The positive output of the rectification circuit 320 is provided to a first positive node 350 and the negative output of the rectification circuit 320 is provided to a negative node 352. A first capacitor 344 is connected in parallel to the rectification circuit 320 across the positive node 350 and the negative node 352. The first capacitor 344 may have a capacitance of about 30 microfarads.

In addition, a first RC circuit may be connected and parallel with the first capacitor 344 and the rectification circuit 320, across the positive node 350 and the negative node 352. The RC circuit includes a first resistor 356 and a capacitor 358. The resistor 356 may be in electrical series connection with capacitor 358. In one implementation, the first side of the resistor 356 may be connected to the positive node 350 and the second side of the resistor 356 may be connected to a first side of the capacitor 358. The second side of the capacitor 358 may be connected to the negative node 352. Although it is understood in certain implementations, the resistor and capacitor could be switched or multiple components could be used to achieve similar effects.

In addition, a diode 360 may be connected between the second side of the resistor 356 and the first side of the capacitor 358. For example, the anode of the diode 360 may be connected between the second side of the resistor 356 and the second side of the capacitor 358 while the cathode of the diode 360 may be connected to positive node 350 of the high power factor circuit 314. In this manner, the diode 360 may be in electrical parallel connection with the resistor 356. As such, the positive node 350 may be connected to a positive terminal of the inverter 316 and the negative node 352 may be connected to a negative terminal of the inverter 316.

While the small capacitance of the capacitor 344 alone provides a useful power factor, there is very little duration for the stabilization. If the supply line suddenly drops for one half of a cycle, it would be preferred for the power supply to continue providing power. Accordingly, a second capacitance from capacitor 358 may be added in such a way as to not affect the high power factor. Accordingly, the capacitor 358 may be thousands of microfarads, similar to FIG. 5. The capacitor 358 may be charged through resistor 356 which limits the charge current that keeps the power factor high. However, if the line voltage and thus the voltage of capacitor 344 suddenly drops, energy flows through the diode 360 to stabilize the inverter voltage.

The second RC circuit is may be connected parallel with the first RC circuit, and the capacitor 344, and the rectification circuit. The second RC circuit may include a first resistor 370 and a capacitor 372. A first side of the resistor 370 is connected to the positive node 350 and the second side of the resistor is connected to the first side of the capacitor 372. The second side of the capacitor 372 is connected to the negative node 352. However, it is understood that the resistor and capacitor may be switched or multiple components may be utilized to provide the same effect.

Overall, the first capacitor 344, the first RC circuit, and the second RC circuit coordinate to provide a highly stable power supply that has a high power factor, for example between 90-95%, while eliminating the necessity for a boost or other active convertor as well as in-rush protection. Accordingly, the positive node 350 may be connected to a positive terminal of the inverter 316 and the negative node 352 may be connected to the negative terminal of the inverter 316. A power supply comprising a rectifier circuit configured to receive a three phase AC signal, a rectification circuit having a positive output connected to a positive node and the rectifier circuit having a negative output connected to a negative node. A capacitor connected in parallel with the rectifier circuit 320 between the positive node 350 and the negative node 352. A first RC circuit including a resistor and capacitor connected in electrical series connection where the resistor and capacitor are connected between the positive node and the negative node in parallel with the first capacitor and the rectifier circuit.

Figure 7:
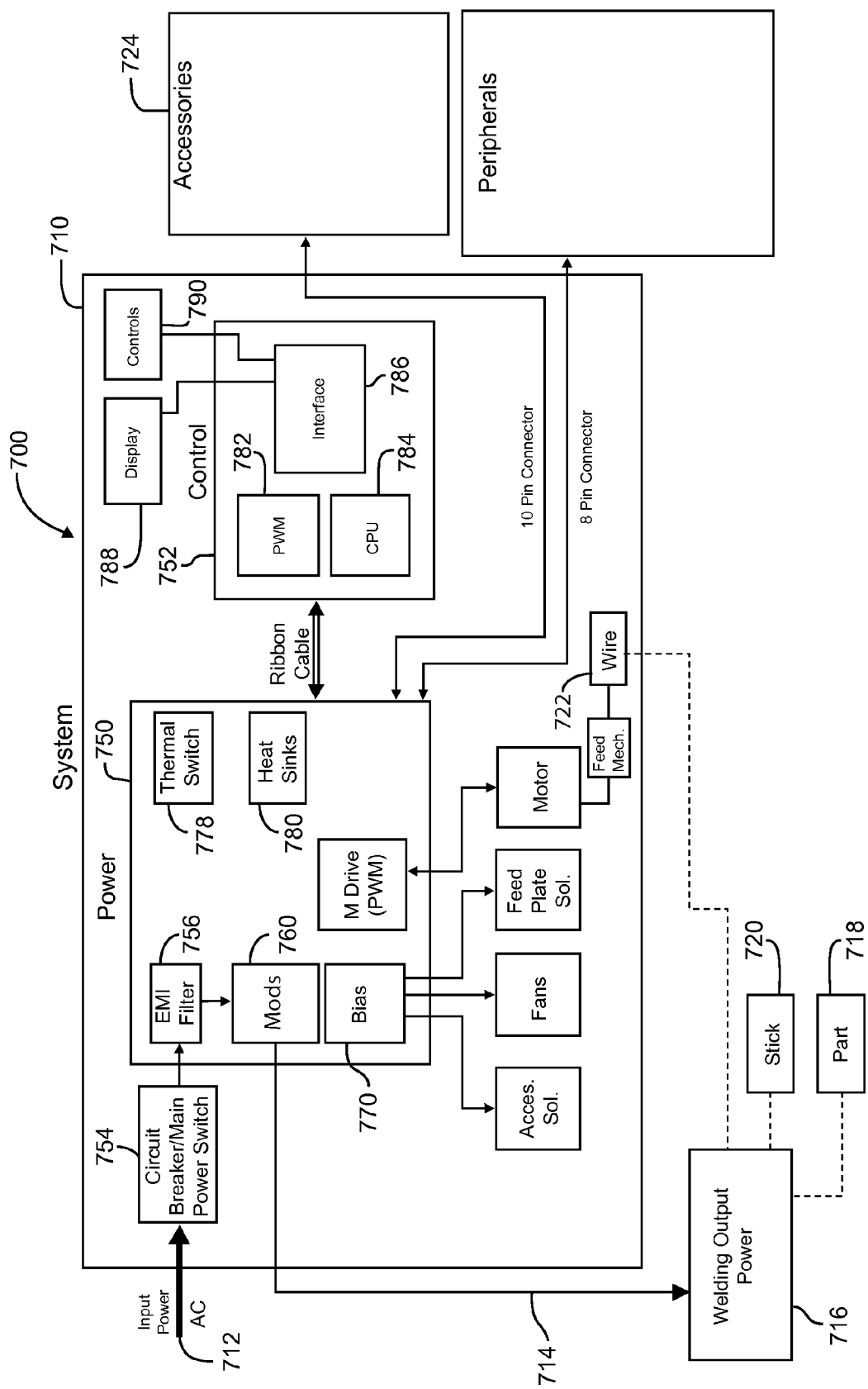
FIG. 7 is a schematic illustration of one implementation of welder that may include the high power factor circuits describe herein.

Now referring to FIG. 7, any of the power supply components described above may be implemented in a welding system 700 as provided. The power supply 710 receives input power 712 which may be a three phase alternating current power line. In some implementations, the power supply 710 may be used for stick welding (also known as Shielded Metal Arc Welding or SMAW) or various other welding applications such as MIG (Metal Inert Gas, also known as gas metal arc welding or GMAW), flux core arc welding, TIG (tungsten inert gas welding, also known as Gas Tungsten Arc Welding or GTAW), plasma arc, or other welding techniques. Therefore, in one example, the current return lead of the welding output power 716 may be provided to a part 718 that is to be welded, and the supply voltage may be provided to an electrode, for example a stick 720 or wire 722. Therefore, as the stick 720 comes in contact with the part 718 an arc may be formed that melts both the base metal and electrode and cooperates to form a weld. In other implementations, the output voltage may be provided through a wire 722 where the wire 722 may be continuously fed to the part to form a continuous weld. In TIG mode the electrode is not melted, generally only the base metal is melted.

The power supply 710 may control the output voltage and the output current, as well as the feeding of the wire to optimize the welding process. In addition, the power supply 710 may be connected to a group of accessories 724.

Within the power supply 710, the input power 712 may be provided to a circuit breaker or switch 754. Power may be provided from the circuit breaker 754 to a power circuit 750. The power circuit 750 may condition the input power to provide a welding output power 716, as well as, for powering various additional accessories to support the welding process. The power circuit 750 may also be in communication with the control circuit 752. The control circuit 752 may allow the user to control various welding parameters, as well as, providing various control signals to the power circuit 750 to control various aspects of the welding process. The power from the circuit breaker 754 may be provided to an EMI filter 756 of the power circuit 750. Power is provided from the EMI filter 756 to the power supply modules 760 as described elsewhere in this application. The power supply modules may provide the welding output power 716.

Power may also be provided to a bias circuit 770 to power a number of accessories internal or external to the power supply 710 that facilitate operation of the power supply, as well as, the welding process. The control circuit 752 may provide control signals to any of the previously mentioned circuits in the power circuit 750 to optimize the weld process and performance of the power supply 710.

The control circuit 752 may include a pulse width modulator 782 and a processor 784 for analyzing various weld characteristics and calculating various weld parameters according to user settings, as well as, various feedback signals. In addition, an interface circuit 786 may be provided to control a display 788 that may provide information to the user of the welding system. The controls 790 may also be in communication with the interface circuit 786 to allow the user to provide input such as various welding parameters to control the operation of the welding process.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

What is claimed is:

1. A power supply for a welder or cutter comprising:
    a rectifier circuit configured to receive a three phase AC signal, the rectifier circuit having an output connected to a positive node and an output connected to a negative node;
    a first capacitor connected in parallel with the rectifier circuit between the positive node and the negative node; and
    a first RC circuit including a first resistor and second capacitor connected in electrical series connection where the first resistor and second capacitor are connected between the positive node and the negative node in parallel with the first capacitor and the rectifier circuit, and wherein the first RC circuit includes a cathode of a diode connected to the positive node and an anode of the diode directly connected between the first resistor and the second capacitor, the diode connected in parallel with the resistor and in series with the second capacitor.

2. The system according to claim 1, wherein the first capacitor has a capacitance of less than 100 microfarads.

3. The system according to claim 2, wherein the first capacitor has a capacitance of 30 microfarads.

4. The system according to claim 1, wherein the second capacitor has a capacitance of greater than 1000 microfarads.

5. The system according to claim 4, wherein the second capacitor has a capacitance between 1000 and 10,000 microfarads.

6. The system according to claim 1, wherein the RC circuit includes a diode with an anode connected between the resistor and capacitor, the diode having a cathode connected to the position node.

7. The system according to claim 1, further comprising a second RC circuit where the second RC circuit is in parallel with the first RC circuit, the first capacitor, and the rectifier circuit.

8. The system according to claim 7, wherein the second RC circuit includes a second resistor and a third capacitor in electrical series connection.

9. The system according to claim 8, wherein the second resistor and the third capacitor are in parallel with the first RC circuit, the first capacitor, and the rectifier circuit.

10. The system according to claim 1, wherein the positive node is connected to a positive terminal of an inverter and the negative node is connected to a negative terminal of the inverter.

11. A power supply comprising:
   a rectifier circuit configured to receive a three phase AC signal, the rectifier circuit having an output connected to a positive node and the rectifier circuit having an output connected to a negative node;
   a first capacitor connected in parallel with the rectifier circuit between the positive node and the negative node;
   a first RC circuit including a first resistor and second capacitor connected in electrical series connection where the first resistor and second capacitor are connected between the positive node and the negative node in parallel with the first capacitor and the rectifier circuit, and wherein the first RC circuit includes a cathode of a diode connected to the positive node and an anode of the diode directly connected between the first resistor and the second capacitor, the diode connected in parallel with the first resistor and in series with second capacitor; and
   a second RC circuit including a second resistor and third capacitor connected in electrical series connection where the second resistor and third capacitor are connected between the positive node and the negative node in parallel with the first capacitor and the rectifier circuit.

12. The system according to claim 1, wherein the first capacitor has a capacitance of less than 100 microfarads.

13. The system according to claim 12, wherein the first capacitor has a capacitance of 30 microfarads.

14. The system according to claim 12, wherein the second capacitor has a capacitance of greater than 1000 microfarads.

15. The system according to claim 14, wherein the second capacitor has a capacitance between 1000 and 10,000 microfarads.

16. The system according to claim 11, wherein the first RC circuit includes a diode with an anode connected between the resistor and capacitor, the diode having a cathode connected to the position node.

17. The system according to claim 16, wherein a second resistor and a third capacitor are in parallel with the first RC circuit, the first capacitor, and the rectifier circuit.

18. The system according to claim 17, wherein the second resistor and the first resistor are both directly coupled to the positive node, and wherein the third capacitor and the second capacitor are both directly coupled to the negative node.

* * * * *